United States Patent [19]

Frazier

[11] Patent Number: 5,525,907
[45] Date of Patent: Jun. 11, 1996

[54] ACTIVE IMPULSE MAGNETOMETER WITH BIPOLAR MAGNETIC IMPULSE GENERATOR AND FAST FOURIER TRANSFORM RECEIVER TO DETECT SUB-SURFACE METALLIC MATERIALS

[75] Inventor: Lawrence M. Frazier, West Covina, Calif.

[73] Assignee: Hughes Missile Systems Company, Los Angeles, Calif.

[21] Appl. No.: 405,690

[22] Filed: Mar. 17, 1995

[51] Int. Cl.[6] .............................. G01V 3/08; G01V 3/12
[52] U.S. Cl. ................... 324/334; 324/329; 324/239; 361/152
[58] Field of Search .................... 324/334, 329, 324/330, 337, 344, 336, 244, 239, 233; 340/850, 551, 552, 572; 307/137, 138; 361/152, 153

[56] References Cited

U.S. PATENT DOCUMENTS

| | | | |
|---|---|---|---|
| 3,619,772 | 11/1971 | Ellis | 324/249 |
| 3,758,849 | 9/1973 | Susman et al. | 324/225 |
| 4,605,898 | 8/1986 | Aittoniemi et al. | 324/232 |
| 4,697,146 | 9/1987 | Extance et al. | 324/244.1 |
| 4,866,424 | 9/1989 | Parks | 340/551 |
| 4,868,504 | 9/1989 | Johnson | 324/329 |
| 4,920,317 | 4/1990 | Lescourret | 324/318 |
| 4,924,448 | 5/1990 | Gaer | 367/88 |
| 5,025,218 | 6/1991 | Ramstedt | 324/334 |

Primary Examiner—Sandra L. O'Shea
Assistant Examiner—Jay M. Patidar
Attorney, Agent, or Firm—Charles D. Brown; Wanda Denson-Low

[57] ABSTRACT

An active impulse magnetometer includes a magnetic field transmitter which generates a low frequency magnetic impulse waveform. A separate magnetometer receiver responds to the transmitted waveform, and produces a receive waveform which is transformed by a Fast Fourier Transform device into the frequency domain. The transformed signal is processed to indicate the presence of any detected objects.

18 Claims, 3 Drawing Sheets

FIG. 6.
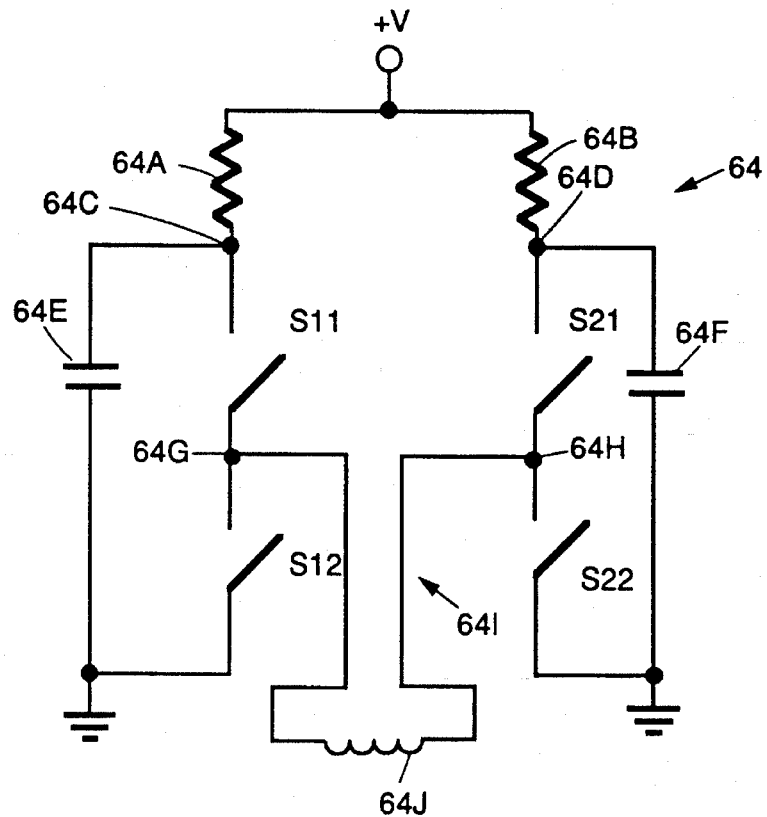
FIG. 7.
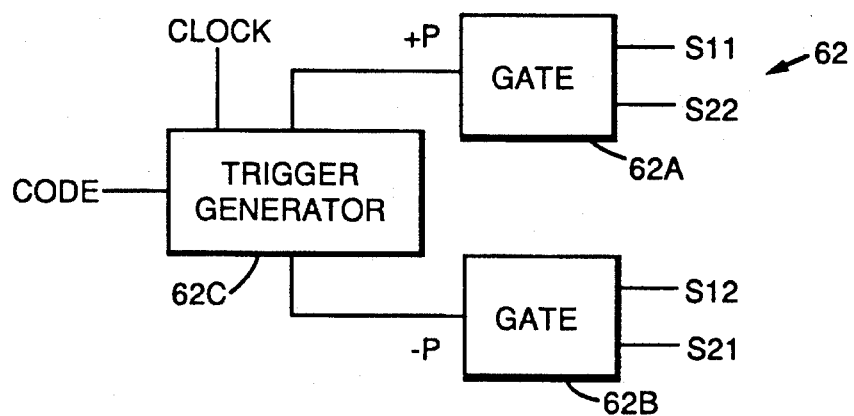
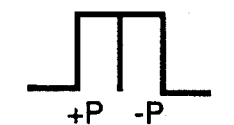
FIG. 8.

ACTIVE IMPULSE MAGNETOMETER WITH BIPOLAR MAGNETIC IMPULSE GENERATOR AND FAST FOURIER TRANSFORM RECEIVER TO DETECT SUB-SURFACE METALLIC MATERIALS

TECHNICAL FIELD

The present invention relates to systems for detecting metal objects such as mines in shallow salt water, and more particularly to a detection system employing a magnetic impulse waveform generated by a magnetic field transmitter which is received by a separate receiver element.

BACKGROUND OF THE INVENTION

The detection and identification of objects at relatively close ranges requires either high range resolution or some other form of "contrast" which will allow the discrimination between targets and clutter to be made. This contrast must be sufficiently unique to allow "automatic" recognition of the contrast and thus "detection" of the desired targets (mines). Clutter, on the other hand, is all of the other fluctuations of the signal which may have some characteristics which appear as a target of interest but which are not. It is the separation of "targets" from "clutter" which limits the performance of all electronic detection systems.

In the classical "balanced coil" techniques used for metal detection (like those found in airports), a fixed frequency oscillator is used as the transmitter. The transmitter develops an "electro-magnetic field" in some form of a coil. A similar coil arrangement is used at the receiver. The receiver is designed so that the direct path energy is canceled in the receiver. The receiver output is sensitive only to disturbances in the "electro magnetic field" near the coil. (Frequently these changes are just capacitance or inductance change effects on a tuned circuit.)

Metal targets are detected as an "unbalanced" condition in the receiver. The closer the field coils are to a metal object the greater the unbalance condition. The coils are moved around over the suspected target area. The metal object is located at the point where the maximum receiver output is achieved, directly over the mine or other metal object.

These "classical" balanced coil systems work quite well when the sensor is directly over the metal object at close range. However, they lose performance rapidly as the distance between the sensor and target increases. These systems also suffer from high levels of attenuation in the salt water because of the carrier frequencies used by the oscillators.

Conventional "hand held" metal mine detection devices have provided a degree of effectiveness for the detection of shallow metal mines on land. However, such devices are typically limited to a few feet range, directly above the metal object being detected. They have been of little or no value in salt water.

Sonar systems have also been tried for mine detection in shallow salt water. However, sonar has a very difficult time operating in shallow water and near the surf. Sonar also has a difficult time with mine size targets on the bottom or which are buried.

Impulse radars (Ultra Wide Band) have been successfully used for detection of both metal and non-metal buried mines under some conditions. These 1 to 10 nanosecond impulse radars work quite well in dry soil and even in fresh water or snow. However, with salt water the attenuation of greater than 60 db per foot is a prohibitive signal loss factor.

Devices known as magnetometers have been very successful in the detection of slight variations in the earth's static magnetic field. These devices are used for submarine detection at depths of more than 500 feet.

The Navy has long used VLF communications systems which have negligible salt water signal attenuations at 10 KHz to 40 KHz carrier frequencies for communications with submarines below the sea and around the world.

SUMMARY OF THE INVENTION

An active impulse magnetometer is described for detecting metal objects such as mines in shallow water. The magnetometer comprises a magnetic transmitter element secured on a movable vehicle, and a pulse generator for driving said transmitter element to transmit first and second magnetic pulses of opposite polarity. A magnetic receiver element is secured on the vehicle in a spaced relationship relative to the transmitter element. The magnetometer further includes means for measuring an impulse response to the magnetic pulses, comprising means responsive to magnetic signals received at the receiver element in response to the transmitted magnetic pulses for performing a fast Fourier transformation of the received signals. The magnetometer includes means for providing a vehicle location signal indicative of a present location of the vehicle, and signal processor responsive to the transformed received signals and to the vehicle location signal to locate metal targets causing disturbances in the magnetic impulse response.

In a preferred embodiment, the movable vehicle is a water vessel, and the magnetic transmitter element is mounted along one of the port or starboard sides of the vessel, and the magnetic receiver element is mounted along the other of the port or starboard sides.

According to one aspect of the invention a controller for controlling is provided for controlling the operation of the pulse generator and measuring means. The controller comprising means for blanking operation of the measuring means during the first magnetic pulse transmission, and for enabling operation of the measuring means during transmission of the second pulse.

BRIEF DESCRIPTION OF THE DRAWING

These and other features and advantages of the present invention will become more apparent from the following detailed description of an exemplary embodiment thereof, as illustrated in the accompanying drawings, in which:

FIG. 6 is a schematic diagram of a current switcher circuit used in the system of FIG. 3.

FIG. 7 shows a schematic diagram of an exemplary implementation of a pulse generator comprising the system of claim 3.

FIG. 8 shows a switch drive waveform for the current switcher of FIG. 6.

DETAILED DESCRIPTION OF THE PREFERRED EMBODIMENT

This invention is an active impulse magnetometer (AIM). It uses a magnetic impulse wave form generated by a magnetic field transmitter which is received by a separate bi-static "active magnetometer" receiver element. This unique waveform has been found to penetrate through aluminum, steel and other metals with little or no attenuation. Tests have demonstrated that a low frequency magnetic impulse has very little loss through ocean salt water. Tests further show that metal targets which are in the sensor field anywhere around the magnetic field generator can be detected as the cause of variations in the received field.

The AIM system is well suited for the detection of metal mines in ocean water. Other applications such as enhanced submarine detection and underwater communications are contemplated.

Figure 1:
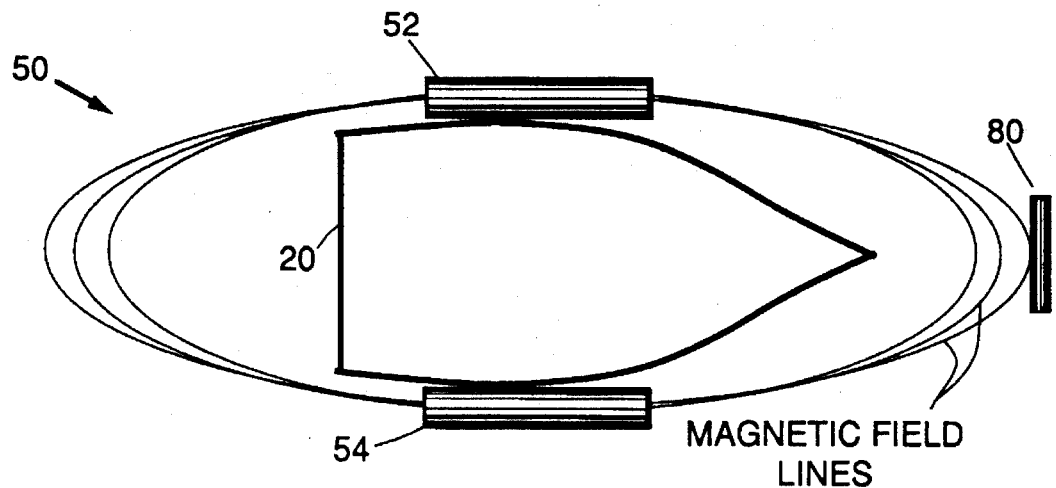
FIGS. 1 and 2 are top and side views, respectively, of a vessel fitted with a mine detection system in accordance with the invention.
Figure 2:
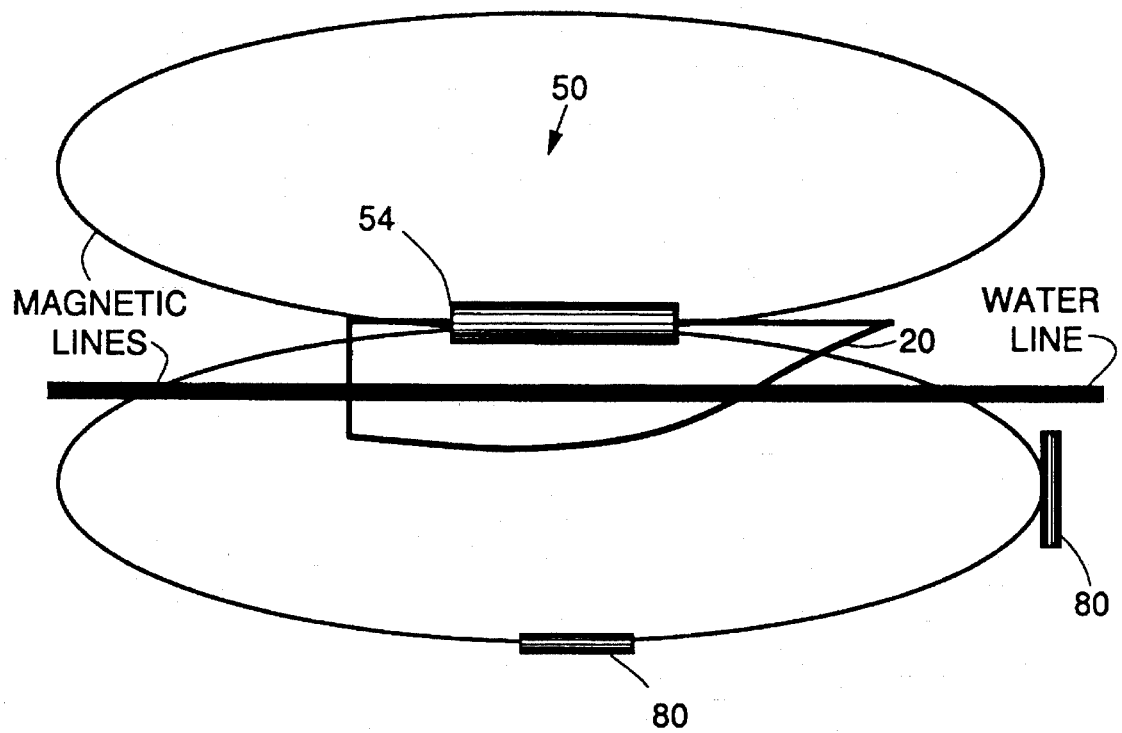

In a fully operational configuration the complete AIM sensor can be mounted on a "mini-sub" or small remote controlled vehicle. It might be lowered over the side or fixed mounted on a small patrol craft. FIGS. 1 and 2 show an embodiment of the sensor 50 mounted on a vessel 20 such as a ship or boat. The sensor system 50 includes a transmitter transducer element 52 and a receiver transducer element 54 mounted on opposite sides of the vessel 20. The objective of the sensor system 50 is to detect the presence and location of a submerged metal target 80.

Figure 3:
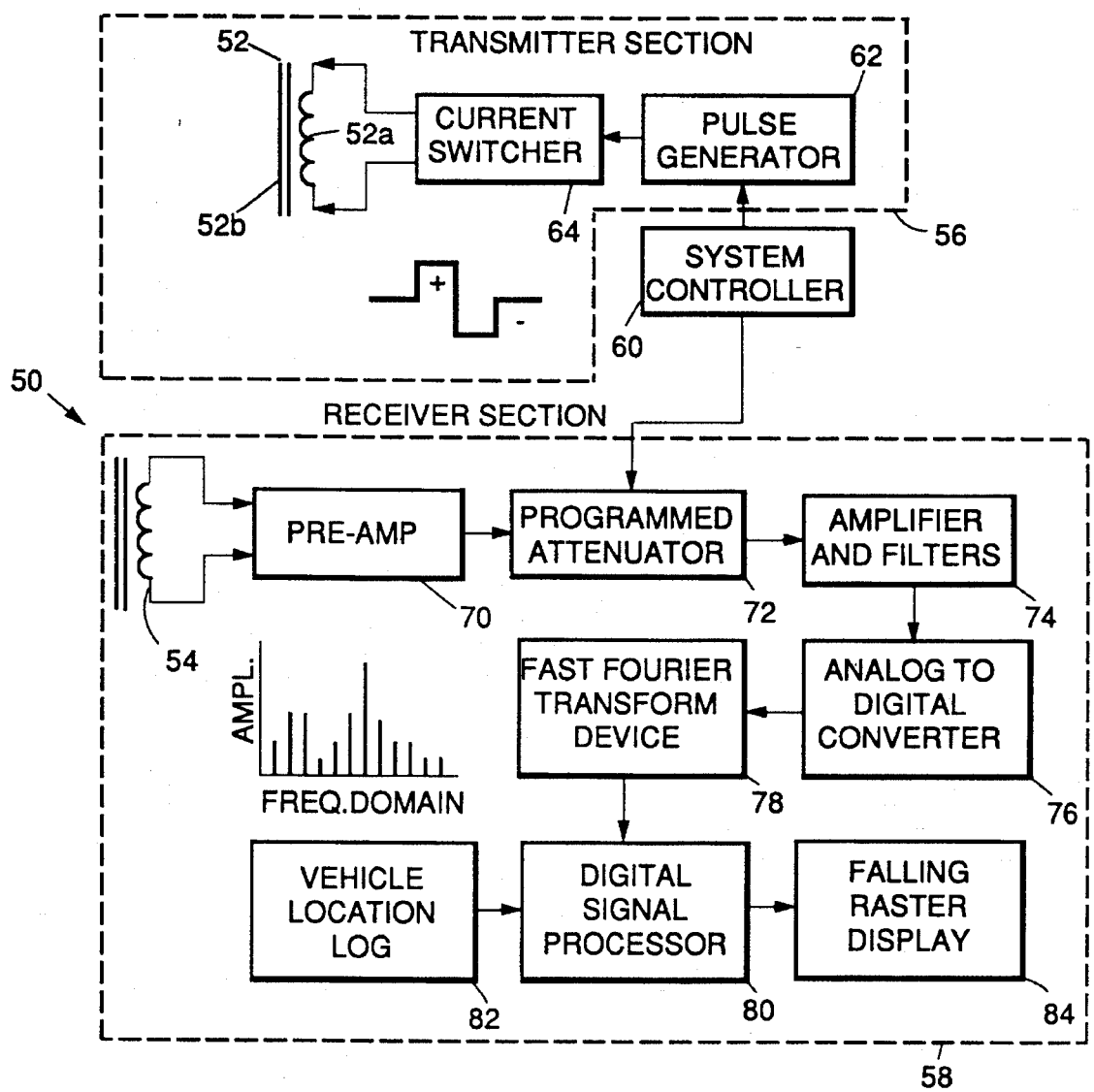
FIG. 3 is a schematic block diagram of the mine detection system of FIG. 1.
Figure 4A:
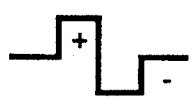
FIG. 4A shows an exemplary transmit magnetic pulse waveform generated by the system of FIG. 3.
Figure 4B:
FIG. 4B shows an exemplary corresponding receive waveform.

FIG. 3 illustrates a schematic block diagram of the sensor system 50. A system controller 60 controls the operation of the system. A transmit section 56 comprises a pulse generator 62, a current switcher 64 and the transmit propagator element 52. The controller 60 triggers the pulse generator to generate a two pulse waveform, as shown in FIG. 8. The current-switcher 64 operates to invert the polarity of the second pulse, to create the transmit waveform shown in FIG. 4A. The transmit waveform is applied to the transmit propagation element 52, which comprises coil 52A wound about a core 52B. This unique bipolar magnetic impulse waveform is preferred over more conventional mono-polar waveforms because the rate of change of the magnetic field from a positive field to a negative field provides improved receiver sensitivity, better time reference as well as better control of the transmitted magnetic field waveform.

The receiver section 58 of the sensor 50 includes the receiver element 54, a preamplifier 70 for applying a first amplification level to the signals received by the receiver transducer element 54. The output from the preamplifier is passed through a programmable attenuator 72, whose attenuation level is set by the controller 60 to operate the receiver in an effective desired on/off state. When the attenuator 72 is controlled to provide maximum attenuation to the received, pre-amplified signal, the receiver 58 is effectively "off"; with a minimum attenuation level set in the attenuator, the receiver is effectively "on." The controller 60 provides a blanking signal to the attenuator 72 to put the receiver in an "off" state during transmission of a positive magnetic pulse, and removes the blanking signal to put the receiver in an on state during transmission of the negative magnetic pulse.

Figure 5:
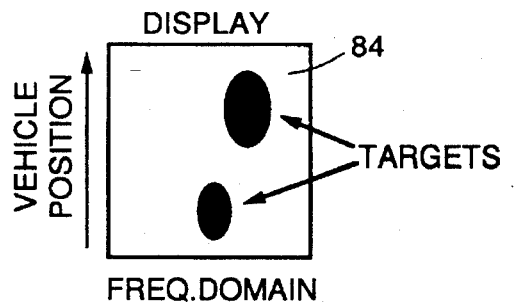
FIG. 5 shows an exemplary raster display comprising the system of claim 1.

The output of the attenuator 72 is passed to an amplifier/filter section 74, where the received signal is amplified further and filtered. This filtering is preferred to reduce 50 Hz or 60 Hz and harmonics thereof, and/or other primary power line frequencies which are often found in harbors and near shore. An analog-to-digital convertor (ADC) 76 converts the amplified, filtered signal into a digital value. In the preferred system there are 1024 digital samples over a 100 millisecond period of time. The digitized signal is applied to the Fast Fourier Transform device 78, which produces a frequency spectrum with 10 Hz resolution over a frequency range of 10 Hz to 10.24 kHz. The transformed signal is processed by the digital signal processor (DSP) 80, which also knows the vessel location as a result of a vehicle location log 82. The DSP 80 controls a falling raster display 84 to display the frequency domain signals versus the vehicle location, as shown in FIG. 5.

The transmitter section 56 of the sensor system 50 provides an impulse magnetic field waveform. In order to transmit information from one location to another, a carrier signal is usually employed, upon which "modulation" is placed which contains the information to be transmitted. It is equally reasonable to transmit the information by a "coded sequence" of impulses which are one cycle of the center frequency of the radio band selected for the data transmission. Multiple single impulses would form a data stream which could be transmitted directly, without a carrier, from one location to another. This form of communication is referred to as impulse data transmission.

FIG. 6 illustrates a schematic diagram of an exemplary embodiment of the current switcher 64 comprising the transmitter. The current switcher 64 includes two pairs of switches S11, S12, S21 and S22, each of which is controlled by a switch control gate comprising the pulse generator 62. Two resistors 64A and 64B are connected in parallel to a voltage source at +V. Switches S11 and S12 are connected in series from node 64C to ground. Switches S21 and S22 are connected in series from node 64D to ground. Capacitors 64E and 64F are connected from respective nodes 64C and 64D to ground, in parallel with the respective switch pairs. Node 64G and 64H are connected to the transmission line 64I. The other end of the transmission line 64I is connected to the transmitter coil 64J.

It will be apparent that the switch pairs provide a means of applying a voltage of selectable polarity to the transmitter coil 64J. Each capacitor 64E and 64F will be charged to a voltage V. Closing switches S11 and S22 while leaving open switches S12 and S21 will apply a voltage pulse of a first polarity to the transmitter coil 64J. Closing switches S21 and S12 while leaving open switches S11 and S22 will apply a voltage pulse of a second polarity to the transmitter coil 64J.

FIG. 7 is a schematic diagram of an exemplary pulse generator 62. The switches S11, S12, S21 and S22 of the current switcher 64 are controlled by a pair of switch control gates 62A and 62B comprising the pulse generator 62. A trigger generator 62C is clocked by a clock signal, and receives a code signal from the system controller 60. This code signal operates the trigger generator 62C to initiate trigger pulses +P and −P. The pulse waveform is shown in FIG. 8. During the first half of the trigger duty cycle, the pulse +P is active, to close switches S11 and S22, and the pulse −P is not active, leaving open switches S12 and S21. During the second half of the trigger duty cycle, the pulse −P is active, to close switches S21 and S12, and the pulse +P is not active, leaving open switches S11 and S22.

The output power of the impulse switch is primarily dependent upon the maximum voltage allowed for switching and on the impedance of the devices S11, S12, S21 and S22 being switched. The faster the switch is toggled from ON to OFF the smaller the amount of heat that must be dissipated from the device during switching. Fast switching times faster than 100 microseconds are preferred to create a good harmonic content in the waveform.

The switches can be implemented by FET switch devices. Commercially available FET devices can switch up to 2000 volts. Because peak power is determined by $E^2/R$, the lower the total resistance of the switch devices (including the load) the greater the power level that can be generated. If, for example, the load impedance was 10 ohms, then the total peak power switched would be (2000×2000)/10=400,000 watts.

At the FFT output, the amplitude and phase of each of the harmonic spectral lines will be determined by the net sum of all of the energy received at the receiving element 54, from all fixed metal objects near the system. When the platform is moved through the water, the net sum of the received energy will change based upon changes in the fields caused by other metal objects when encountered. Because the magnetic lines of force are curved, the sensor will indicate changes at any location around the craft. A computerized histogram of the relative amplitude and phase disturbances (or differences) will localize the location of the metal device at right angles to the path of travel. This is in effect a "spherical ring" around the platform of maximum sensitivity.

Because different types of metal have different responses to magnetic impulse fields, to some degree the type of targets can be identified to aid in clutter reduction. Such things as large metal pipes buried under the beach will be indicated, but the response characteristics will be much different than the much smaller metal mines.

The output from the sensor will depend on the specific user's needs. In an operational system, audio output signals could be provided to a swimmer using earphones or some other form of audio transducer. Indicator lights could also be used when desired.

In the side looking search mode, the AIM system can be maneuvered along the beach 300 to 500 feet from the beach on the first pass. The data from this pass is recorded in a computer and displayed as an "intensity varying strip chart" on the display screen. The boat would then move in closer by 100 feet or so and make another pass. This would continue until the boat was as close as safely possible. The mines and any other metal objects would show up as changes in intensity on the display screen at the point in the path where the sensor was the closest to the mines. This same process can be done covertly using a submerged mini-sub or remotely controlled vehicle.

In the forward looking search mode, swimmers follow behind the AIM system. Any metal objects detected ahead of the sensor would cause an alarm. The forward looking mode is possible because the lines of magnetic force curve around the magnet rather than going in straight line as radar or sonar waves do.

In an exemplary system, the magnetic propagators (coils with cores) are mounted on each side of a small boat below the water line. In an exemplary embodiment, each element is approximately 1.5 to 2 inches in diameter. Each element is housed in a PVC plastic tube (or equivalent) which is sealed. The transmitter propagator elements and the receiver elements are 6 to 8 feet long for target ranges of 20 to 40 feet. It is preferred to have a spacing of 6 to 8 feet between the propagator and receiver elements.

The mines in the shallow water areas are typically in metal containers with pressure sensors, magnetic sensors or trip wire activators. They may be on the bottom or buried in the sand. Typical water depths of up to 40 feet are expected.

A sensor which detects these mines should be capable of working while submerged with distances between the surface and the bottom of 5 feet to as much as 50 feet. Preferably, there is a method of "marking" the mine location once they have been detected to that they can be avoided or destroyed. It would also be highly desirable to identify mines located in the surf and on the beach. A global positioning system (GPS) device could provide a reasonable method of mine location identification.

An active impulse magnetometer in accordance with the invention provides efficient detection of metal mines in shallow sea water. Some of the characteristics of the system are:

1. A non-fluctuation or stationary "DC Magnetic Field" (for example, the earth's magnetic field) suffers little or no attenuation by salt water or even metal objects.

2. If a magnetic field is "amplitude modulated" with information, that information may also be propagated through metal or salt water. There will be little or no attenuation other than the normal ($1/R^3$) one way loss. The magnetic field become the information carrier.

The range loss (R) is strongly affected by the relative distance between the magnetic poles of the propagator elements. As the distance between the magnetic poles of a single magnet becomes greater, so does the relative magnetic field at a given distance become greater. Thus, the increased distance between the magnetic poles produces a "gain" effect similar to the "gain" effect experienced in electro magnetic radiators where the antenna area is increased to increase the gain. The length of the path or area covered by these lines of force is dependent upon the distance between the two dipoles (N–S). Likewise, the "field strength" is also related to the dipole separation. The earth is a good example of widely spaced dipoles with lines of magnetic force extending thousand of miles away from the earth's surface.

3. As the magnetic field modulating frequency is increased above 10 KHz, some information loss is experienced in salt water and through some metals. As modulation frequencies increases above 100 KHz, the attenuation becomes significant but predictable. This is true for each different type of media being penetrated.

4. Magnetic lines of force always curve around the magnetic dipoles (North pole - South Pole) of any magnet. These lines form well defined curves as they leave the North Pole and proceed to the South Pole. Thus, these lines of force can be influenced by any metal objects which are in the curved path.

5. When the magnetic field receiver element (similar to the transmitter propagator element) is placed in an area of the lines of force (frequently parallel to the other element) the receiver can detect any modulation which is placed on the originating magnetic field. The greater the distance between the propagator dipoles (propagator length) the greater the distance would be between the transmitting and receiving elements for a give transmitter power level.

6. A magnetic impulse contains all frequencies. Thus, a magnetic impulse which lasts for 10 milliseconds contains low frequency components (100 Hz) which can be used to establish a DC magnetic field for a short period of time. All frequencies above 100 Hz will also be contained in the waveform.

7. The waveform received by the receiving element is a modified version of the transmitted waveform. A number of factors will modify this received waveform, one of which is the presence of any metallic objects within the magnetic field envelope.

8. A Fast Fourier Transform (FFT) device is used to establish the frequency domain characteristics of the received impulse response. This FFT is extremely sensitive to slight changes of both amplitude and phase in the overall received waveform.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. An active impulse magnetometer system, comprising:
   a magnetic transmitter element;
   a pulse generator for driving said transmitter element to transmit first and second magnetic pulses of opposite polarity in rapid succession to provide a rapid rate of change of magnetic field from a first polarity to a second polarity and thereby create a wide bandwidth of energy, said first and second pulses providing a bipolar magnetic impulse waveform transmitted by said transmitter element;
   a magnetic receiver element;
   means for measuring an impulse response of objects within a detection region to said transmitted bipolar magnetic impulse waveform, said means comprising means responsive to magnetic signals received at said receiver element in response to said transmitted bipolar magnetic impulse waveform for performing a fast Fourier transformation of said received signals; and
   signal processor responsive to said transformed received signals to indicate the presence of metal objects causing disturbances in said magnetic impulse response.

2. The magnetometer system of claim 1 wherein said transmitter element comprises a coil having a ferrous core.

3. The magnetometer system of claim 1 wherein said receiver element comprises a coil having a ferrous core.

4. The magnetometer system of claim 1 wherein said transmitter element and said receiver element are mounted on a movable vehicle.

5. The magnetometer system of claim 4 wherein movable vehicle is a water vessel having respective port and starboard sides, and said magnetic transmitter element is mounted along one of the port or starboard sides of said vessel, and said magnetic receiver element is mounted along the other of said port or starboard sides.

6. The magnetometer system of claim 1 further including a controller for controlling operation of said pulse generator and said measuring means, said controller comprising means for blanking operation of said measuring means during said first magnetic pulse transmission, and for enabling operation of said measuring means during transmission of said second pulse.

7. An active impulse magnetometer, comprising:
   a magnetic transmitter element secured on a movable vehicle;
   a pulse generator for driving said transmitter element to transmit first and second magnetic pulses of opposite polarity in rapid succession to provide a rapid rate of change of magnetic field from a first polarity to a second polarity and thereby create a wide bandwidth of energy, said first and second pulses providing a bipolar magnetic impulse waveform transmitted by said transmitter element;
   a magnetic receiver element secured on said vehicle in a spaced relationship relative to said transmitter element;
   means for measuring an impulse response of objects within a detection region to said transmitted bipolar magnetic impulse waveform, said means comprising means responsive to magnetic signals received at said receiver element in response to said transmitted bipolar magnetic impulse waveform for performing a fast Fourier transformation of said received signals;
   means for providing a vehicle location signal indicative of a present location of said vehicle; and
   signal processor responsive to said transformed received signals and to said vehicle location signal to locate metal targets causing disturbances in said magnetic impulse response.

8. The magnetometer of claim 7 wherein said transmitter element comprises a coil having a ferrous core.

9. The magnetometer of claim 7 wherein said receiver element comprises a coil having a ferrous core.

10. The magnetometer of claim 7 wherein said movable vehicle is a water vessel having respective port and starboard sides.

11. The magnetometer of claim 10 wherein said magnetic transmitter element is mounted along one of the port or starboard sides of said vessel, and said magnetic receiver element is mounted along another of said port or starboard sides.

12. The magnetometer of claim 7 further a controller for controlling operation of said pulse generator and said measuring means, said controller comprising means for blanking operation of said measuring means during said first magnetic pulse transmission, and for enabling operation of said measuring means during transmission of said second pulse.

13. A mine detector for detection of sea mines, comprising:
   a magnetic transmitter element secured on a movable sea-going vessel having respective port and starboard sides;
   a pulse generator for driving said transmitter element to transmit first and second magnetic pulses of opposite polarity in rapid succession to provide a rapid rate of change of magnetic field from a first polarity to a second polarity and thereby create a wide bandwidth of energy, said first and second pulses providing a bipolar magnetic impulse waveform transmitted by said transmitter element;
   a magnetic receiver element secured on said vessel in a spaced relationship relative to said transmitter element;
   means for measuring an impulse response of objects within a detection region to said transmitted bipolar magnetic impulse waveform, said means comprising means responsive to magnetic signals received at said receiver element in response to said transmitted bipolar magnetic impulse waveform for performing a fast Fourier transformation of said received signals; and
   signal processor responsive to said transformed received signals to locate mines within said detection region causing disturbances in said magnetic impulse response.

14. The mine detector of claim 13 wherein said transmitter element comprises a coil having a ferrous core.

15. The mine detector of claim 13 wherein said receiver element comprises a coil having a ferrous core.

16. The mine detector of claim 13 wherein said magnetic transmitter element is mounted along one of the port or starboard sides of said vessel, and said magnetic transmitter element is mounted along another of said port or starboard sides.

17. The mine detector of claim 13 further a controller for controlling operation of said pulse generator and said measuring means, said controller comprising means for blanking operation of said measuring means during said first magnetic pulse transmission, and for enabling operation of said measuring means during transmission of said second pulse.

18. The mine detector of claim 13 further comprising means for providing a vessel location signal indicative of a present position of said vessel, and said signal processor is responsive to said vessel location signal to identify the location of detected mines.

* * * * *